Patented July 17, 1928.

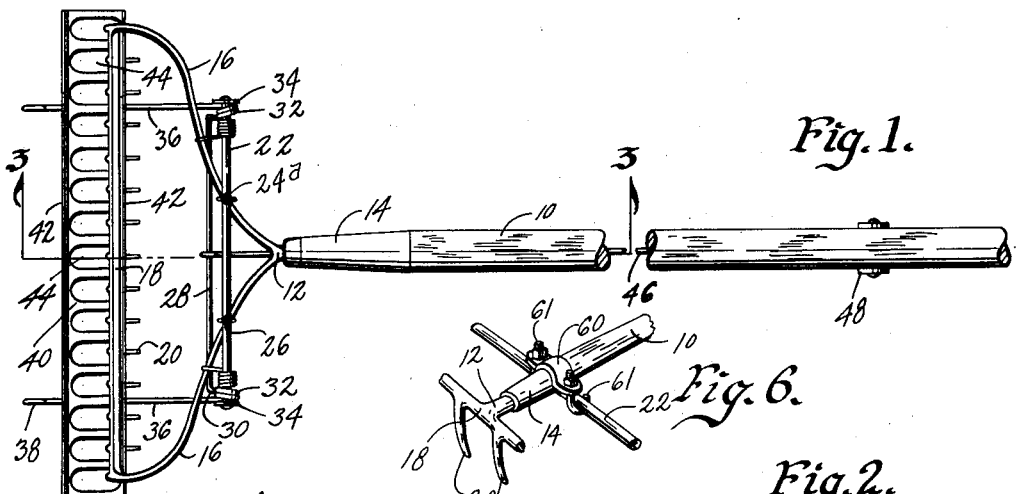

1,677,635

UNITED STATES PATENT OFFICE.

FLETCHER A. HOWE AND NIELS C. BANG, OF SPENCER, IOWA.

CLEANER ATTACHMENT FOR RAKES.

Application filed May 31, 1927. Serial No. 195,206.

The general purpose of our present invention is to provide an attachment of very simple, durable and inexpensive construction adapted to be mounted on ordinary garden rakes for conveniently cleaning their teeth.

Another object of our invention is to provide the combination of a rake and an attachment for cleaning the rake, with parts so arranged and connected together that the cleaning operation may be effectively accomplished, preferably by movement in which the cleaner swings along the rake teeth with movement in two directions.

Another purpose is to provide such a construction of the attachment as can be quickly, readily and conveniently mounted on rakes of different kinds.

With these and other objects in view, our invention consists in the construction, arrangement and combination of the various parts of our cleaner attachment for rakes, whereby the objects contemplated are attained, as hereinafter more fully set forth, pointed out in our claims, and illustrated in the accompanying drawings, in which:

Figure 1 is a top or plan view of a rake equipped with an attachment embodying our invention.

Figure 2 is a side elevation of the same, the attachment being shown in dotted lines in its position assumed after its teeth cleaning movement.

Figure 3 is a detail, sectional view taken on the line 3—3 of Figure 1.

Figure 4 is a side elevation illustrating the position of the attachment when operated in one manner;

Figure 5 is a side elevation of the device illustrating another use of the attachment; and Figure 6 is a perspective view illustrating a modified means of securing our attachment to a rake.

In the accompanying drawings, we have used the reference numeral 10 to indicate generally the ordinary handle of a garden rake. The rake proper has a shank 12 received in a socket in the end of the handle 10. Received in that end of the handle 10 is a ferrule 14 for reinforcing the handle against splitting.

Extending away from the shank 12 and diverging on curved lines are the rake members 16, which extend at their further ends away from the handle 10 and almost parallel therewith, and the outer ends of the members 16 are connected by the bar or strip 18 from which project the ordinary rake teeth 20.

Our improved attachment comprises a transverse rod 22 adapted to rest on the members 16 at points spaced from the shank 12 as illustrated in Figures 1 and 3 for instance and to project laterally beyond the portions of the member 16 upon which it rests.

For securing the rod 22 to various makes of rakes regardless of the ordinary variations, we provide two fastening clamps, each comprising a yoke 24 adapted to receive one of the arms 16 and the rod 22 and having at its upper end a pair of upwardly extending portions 24ª, each having the form of a half cylinder, so that they may be drawn together to form a single cylinder externally screw-threaded to receive the nut 26 by which they may be fastened together to form a single cylinder externally screw-threaded to receive the nut 26 by which they may be fastened together for fastening the rod 22 on the members 16 or other suitable clamp such as, for instance, the one shown in Figure 6. The clamping arrangement comprises a clip 60 having perforated ears through which hook bolts 61 extend for securely holding the supporting rod 22 in contact with the under surface of the rake handle 10.

The operative part of the attachment is preferably made of stiff wire and comprises a cross member 28 normally extended across substantially parallel with the rod 22 below the members 16 and preferably forwardly slightly with relation to the rod 22.

Considering the parts as they stand in normal position when the rake is horizontal, as illustrated in Figure 2, it will be noted that the wire at the ends of the rod 28 is bent upwardly forming arms 30, which terminate in coils 32 rotatably mounted on the ends of the rod 22 adjacent to the heads 34 thereon.

From the coils 32, the wire is extended forwardly away from the handle 10 in the form of two arms 36 parallel with each other and curved downwardly slightly from end to end as shown in Figure 2. These arms project between the teeth 20 and substantially beyond them and terminate in loops 38.

We provide what for convenience we call a cleaner grid, preferably comprising a sheet metal plate 40 resting on and secured to the arms 36 and provided at its side edges with the up-turned flanges 42, which may be crimped to form flanges of double or triple thickness if desired.

The cleaner grid plate 40 may be welded or otherwise secured to the arms 36. It is provided with a series of holes 44 elongated lengthwise of the rake and receiving the teeth 20 as illustrated in Figures 1, 2 and 3.

Secured to the central part of the rod member 28 is a wire or rod or the like 46 extending lengthwise along and underneath the handle 10.

Pivoted to the handle 10 and substantially spaced from the rake teeth are the arms of a yoke 48 which has the central projecting finger 50 to which the rod or wire 46 is pivoted.

A handle 42 is secured to the yoke 48 and projects up the handle therefrom.

Coil springs 54 are mounted on the rod 22 adjacent to the respective coils 32 and are formed with suitable hook ends 54ª and 54ᵇ (see Figures 4 and 5) suitably connected with the arms 16 and the arms 30 for normally exerting yielding tension to hold the grid plate 40 in raised position, as illustrated in Figure 3.

In the practical use of our improved attachment and rake, the rake may be used in the ordinary way for raking the lawn or raking in a garden.

If the teeth become clogged with leaves or the like, the rake may be lifted and the handle 52 swung from its full line position shown in Figure 2 to its dotted line position shown in that figure.

The arms 36 and the grid plate 40 will thereby swing from their full line position shown in Figure 2 to their dotted line position as illustrated in that figure against the tension of the springs 54.

The teeth 20 are so arranged and the holes 44 are so shaped that when the attachment is in its normal position, the teeth 20 stand in the left-hand ends of the holes 44 as illustrated in Figures 1 and 2.

During the teeth cleaning movement, the grid not only swings lengthwise of the teeth 20 but also moves on the arc of such a circle as to have a slicing or shearing movement, so that at the finish of the movement the teeth 20 are near the left-hand ends of the openings 44. (See Figure 2.)

Thus the grid has a double cleaning movement with relation to the teeth 20, and we find that thereby we secure a more effective cleaning action.

As soon as the handle 52 is released, the springs 54 will return the arms 36 to their normal position shown in full lines in Figure 2.

It will have been noted that the ends of the arms 36 having the loops 38 project beyond the grid plate 40. These projecting portions of the arms 36 serve several functions. The handle of the rake may be swung upwardly and these projecting ends may be used to form two shallow grooves in the garden for planting or marking planting lines. (See Figure 5.)

If it is not desired to use the handle 42 for cleaning the rake teeth, the rake may be tilted upwardly until the loops 38 rest on the ground, and while they are held against the ground, the rake may be swung on the rod 28 as a pivot to the position shown in Figure 4 for effecting the cleaning operation.

This last operation may be performed also if the teeth at any time should become so heavily clogged as to prevent satisfactory operation by means of the handle 42.

It will thus be seen that we have provided a very simple and effective attachment and rake combination, the parts being so arranged as to interfere to a minimum degree with the ordinary uses of the rake and to provide for convenient and easy cleaning of the rake teeth.

We claim as our invention:

1. An attachment for rakes comprising a cross rod, means for mounting said rod on a rake, said means comprising a half round rod extending around portions of the rake and said cross rod, the ends of said half round rod being threaded for forming a bolt when brought adjacent each other and a nut on said ends, a cross member having right-angled extensions at its ends terminating in loops rotatably mounted on said rod, said loops having parallel arms projecting away therefrom, a tooth cleaning grid secured to said last-named arms spaced from the extreme free ends thereof formed with a plurality of elongated openings, a link member pivoted to said second-described rod, a yoke adapted to be pivoted to a rake handle and to said link having a projecting handle.

2. The combination of a rake comprising a handle, a pair of arms diverging therefrom, a bar connecting said arms formed with teeth, a rod, means for detachably fastening said rod transversely across said arms near said handle, a second rod below said arms and normally standing forwardly with relation to said first rod having arms extending at right angles to said first rod and terminating in coil springs rotatably mounted on the first rod, arms projecting forwardly from said coils through and beyond said teeth, a tooth cleaning grid supported on said last-described arms and spaced from their extreme ends having elongated openings receiving said teeth, springs mounted on said first rod and connected with said first and second arms for normally holding said cleaning grid adjacent to said bar, a yoke pivoted to said handle having a projecting operating member and a projecting arm, and a link element pivoted to said second rod and to said last-described arm.

3. The combination of a rake comprising a handle, a pair of arms diverging therefrom, a bar connecting said arms formed with teeth, a rod, means for detachably fastening said rod transversely across said arms near said handle, a second rod below said arms and normally standing forwardly with relation to said first rod having arms extending at right angles to said first rod and terminating in coil springs rotatably mounted on the first rod, arms projecting forwardly from said coils through and beyond said teeth, a tooth cleaning grid supported on said last-described arms and spaced from their extreme ends having elongated openings receiving said teeth, springs mounted on said first rod and connected with said first and second arms for normally holding said cleaning grid adjacent to said bar, a yoke pivoted to said handle having a projecting operating member and a projecting arm, and a link element pivoted to said second rod and to said last-described arm, said teeth being so shaped and said teeth cleaning grid being so arranged with relation to said coils that when said grid is moved for teeth cleaning operation it will swing longitudinally and also across said teeth.

Des Moines, Iowa, May 18, 1927.

FLETCHER A. HOWE.
NIELS C. BANG.